(12) United States Patent
Cadden et al.

(10) Patent No.: US 8,752,458 B2
(45) Date of Patent: Jun. 17, 2014

(54) CUTTING TOOL

(75) Inventors: Stephen Cadden, Glasgow (GB); Campbell Wallace, Glasgow (GB); Ken Nelson, Glasgow (GB); Manjit Lall, Glasgow (GB); Steve Chatters, Glasgow (GB)

(73) Assignee: BPB Limited (GB)

( * ) Notice: Subject to any disclaimer, the term of this patent is extended or adjusted under 35 U.S.C. 154(b) by 1801 days.

(21) Appl. No.: 11/988,833

(22) PCT Filed: Jun. 16, 2006
(Under 37 CFR 1.47)

(86) PCT No.: PCT/GB2006/002222
§ 371 (c)(1),
(2), (4) Date: Jun. 28, 2011

(87) PCT Pub. No.: WO2007/010177
PCT Pub. Date: Jan. 25, 2007

(65) Prior Publication Data
US 2012/0090183 A1 Apr. 19, 2012

(30) Foreign Application Priority Data
Jul. 16, 2005 (GB) .................................. 0514654.3

(51) Int. Cl.
*B26B 3/00* (2006.01)
*B26B 3/08* (2006.01)

(52) U.S. Cl.
USPC ........ 83/13; 30/280; 30/287; 30/294; 30/299; 30/306; 30/307; 30/314; 30/319

(58) Field of Classification Search
USPC ................ 83/13, 879–881, 883, 885, 698.21; 30/279.2, 280, 283, 287, 289, 290, 30/294, 299, 302–304, 306, 307, 314–317, 30/319, 320
See application file for complete search history.

(56) References Cited

U.S. PATENT DOCUMENTS

| | | | | |
|---|---|---|---|---|
| 2,529,210 A | * | 11/1950 | Butler | 30/294 |
| 2,611,179 A | * | 9/1952 | Butler | 30/294 |
| 3,174,225 A | * | 3/1965 | Abraham | 30/287 |
| 3,610,079 A | * | 10/1971 | Ashby | 83/883 |
| 4,062,116 A | * | 12/1977 | Arnott | 30/319 |

(Continued)

FOREIGN PATENT DOCUMENTS

| | | |
|---|---|---|
| DE | 3624429 C1 * | 10/1987 |
| DE | 102 18 580 C1 | 8/2003 |

(Continued)

OTHER PUBLICATIONS

International Search Report PCT/GB2006/002222, dated Sep. 22, 2006.

*Primary Examiner* — Jason Daniel Prone
(74) *Attorney, Agent, or Firm* — GrayRobinson, P.A.; Michael J. Colitz, III

(57) ABSTRACT

Disclosed is a cutting tool that is capable of performing cutting operations on a variety of materials such as, for example, plasterboard, glass, wood, laminated wood, cardboard, plastics, such as PERSPEX®, tiles, or the like. The cutting tool comprises an upper and lower part with the upper and lower parts being separated by spacing means that are preferably retractable. The upper and lower parts include at least one cutting device. The upper and lower parts are held together by magnetic attraction.

22 Claims, 25 Drawing Sheets

(56) References Cited

U.S. PATENT DOCUMENTS

| | | | |
|---|---|---|---|
| 4,662,070 A | | 5/1987 | Reddig et al. |
| 4,739,555 A | * | 4/1988 | Jurgens .......................... 30/294 |
| 5,054,695 A | * | 10/1991 | Koornhof ..................... 30/279.2 |
| 5,488,773 A | * | 2/1996 | Fletcher .......................... 30/294 |
| 5,659,961 A | | 8/1997 | Borbrink et al. |
| 6,298,561 B1 | * | 10/2001 | Decker .......................... 30/289 |
| 8,245,406 B2 | * | 8/2012 | Ali ................................. 30/294 |
| 2009/0094842 A1 | * | 4/2009 | Yoo ................................ 30/294 |

FOREIGN PATENT DOCUMENTS

| | | | |
|---|---|---|---|
| EP | 1919674 B1 | * | 5/2012 |
| FR | 2 728 498 A | | 6/1996 |
| GB | 2277705 A | * | 11/1994 |
| SU | 1063902 A | * | 12/1983 |
| WO | WO 2007010177 A1 | * | 1/2007 |

\* cited by examiner

CUTTING TOOL

FIELD OF THE INVENTION

This invention relates to a cutting tool. In particular, the present invention relates to a cutting tool which is capable of performing cutting operations on a variety of materials such as, for example, plasterboard.

BACKGROUND OF THE INVENTION

Plasterboard comprises a core of aerated gypsum plaster sandwiched between two sheets of tough paper or card. In the United Kingdom where homes are almost always constructed from brick and mortar, plasterboard is used mainly for lining internal walls or ceilings and for building partition walls. In the United States, plasterboard which is commonly known as wallboard or drywall, is often used to construct entire homes due to outer walls routinely being made from wood.

To cut plasterboard, it is common to use a knife such as a Stanley Knife (Trade Mark) to cut along a pre-marked pencil line. However, such a technique is inefficient due to a two-step cutting process being required. In the first cutting step, the knife scores and cuts through a paper-like layer on a first side of the plasterboard. By applying pressure along the cut line, the plasterboard snaps open. However, it is then necessary to perform a second cutting step to cut through the paper-like layer on the rear side of the plasterboard which remains intact even on snapping the plasterboard open. The second cutting step can prove to be awkward and unnecessarily strenuous as it is usually necessary to try and cut the paper-like layer on the rear side from below the plasterboard. Such a two-step cutting process is also not a clean process and leads to unnecessary dust and debris being created. An unsatisfactory cut may also be obtained as it is difficult to perform the second cutting step exactly in line with the cut formed in the first cutting step. A final trimming step or use of some sandpaper may be required to obtain a straight cut or smooth edge.

Alternative cutting techniques may use a jig-saw, plasterboard saw or utility saw. However, with such techniques it is difficult to cut out sections from within board material such as plasterboard. These techniques which completely cut through the plasterboard also generate significant amounts of dust and debris. Using electrical appliances such as a jig-saw to cut plasterboard also requires there to be an electrical power source present, which is always not the case.

It is also possible to use a cutting tool as described in U.S. Pat. No. 5,659,961, which is incorporated herein by reference. However, the cutting tool described in U.S. Pat. No. 5,659,961 suffers from a number of disadvantages. For example, the cutting tool is difficult to control, thereby increasing the difficulty to obtain a clean straight cut. It is also difficult to obtain a shaped cut-out section using the cutting tool in U.S. Pat. No. 5,659,961 due to the lack of control.

It is an object of at least one aspect of the present invention to obviate or mitigate at least one or more of the aforementioned problems.

It is a further object of at least one aspect of the present invention to provide an improved cutting tool for performing cutting operations.

SUMMARY OF THE INVENTION

According to a first aspect of the present invention there is provided a cutting tool capable of performing cutting or scoring operations, said cutting tool comprising:

an upper part and a lower part;

said upper and lower parts capable of being separated by spacing means;

at least one of said upper and lower parts comprising a cutting device; and wherein said upper and lower parts are held together with magnetic attraction.

Typically, the magnetic attraction may be capable of being formed by at least a first magnetic means positioned substantially to maximise control of the cutting tool. The magnetic means may interact with metal and/or magnetic means in other parts of the cutting tool.

Conveniently, there may also be a second magnetic means. The at least first and second magnetic means may be positioned in the upper and/or lower parts to maximise the control of the cutting tool. It has been found advantageous to provide a separation of about 5 to 20 cm between the at least first and second magnetic means to increase the magnetic moment between the magnetic means.

There may be a plurality of magnetic means in the upper and/or lower parts. For example, there may be any suitable number of magnetic means such as first and second magnetic means in both the upper and lower parts.

In a preferred embodiment the at least first magnetic means may be positioned anywhere in either a front or rear half of one of the upper and lower parts. Preferably, the second magnetic means may be positioned anywhere in either a front or rear half of one of the upper and lower parts. The first and second magnetic means may be formed by a single magnetic unit, which is shaped to form the necessary first and second magnetic means, or may be formed from two separate magnetic units. Conveniently, the first magnetic means may be positioned in a front half, preferably a front end, of one of the upper and lower parts, and the second magnetic, means may be positioned in rear half, preferably a rear end, of one of the upper and lower parts.

It has advantageously been found that by positioning the at least first and second magnetic means substantially in a front and rear half, of at least one of the upper and lower parts, respectively, provides improved control of the cutting tool. Therefore, by positioning the at least first and second magnetic means substantially in a fore and aft position of at least one of the upper and lower parts provides improved control allowing, for example, straight cut lines or circular cut-outs to be obtained.

In particular embodiments, first and second magnetic means may be positioned substantially in a front and rear half of both the upper and lower parts of the cutting tool. Preferably, the first and second magnetic means in both the upper and lower parts may be positioned at substantially the front and rear ends of the cutting tool or may be at substantially mid-points of both the front and rear halves of the upper and lower parts. Alternatively, the magnetic means may be located substantially adjacent the cutting devices. The first and second magnetic means in both the upper and lower parts may be substantially aligned with one another.

Alternatively, the magnetic means may be located substantially adjacent the cutting devices. The magnetic means may thus be substantially in front of and/or behind the cutting devices or may be located on either one or both sides of the cutting devices. In embodiments with magnetic means on both sides of the cutting devices, there may be a total of four magnets. The magnetic means may preferably form a substantially symmetric arrangement in an equidistant arrangement around the cutting devices which may help to control the cutting tool during use.

Typically, there may be cutting devices in both the upper and lower parts and there may be magnetic means positioned substantially at the front and/or rear of both cutting devices i.e. substantially in front of and/or substantially behind cutting surfaces of the cutting devices. There may be a separation of about 0.5 to 10 cm between the magnetic means and the cutting devices and typically about 1 to 5 cm. Preferably, the magnetic means and cutting devices in both the upper and lower parts may be substantially aligned with one another.

Typically, the first and second magnetic means may be separated by about 1 to 20 cm. The cutting devices may be located substantially between the first and second magnetic means and may be equidistant from the first and second magnetic means. Alternatively, magnetic means located at the rear of the device may be located slightly closer to the cutting device. The first and second magnetic means may be substantially adjacent or within 1 to 10 cm of the front and rear of the cutting device.

Conveniently, magnetic means in the upper part are substantially above magnetic means in the lower part. This facilitates the control of the cutting tool and prevents the lower part falling off during use.

In alternative embodiments, at least first and second magnetic means may be positioned on substantially either side of a cutting device which may, for example, be substantially centrally mounted. In this embodiment, the magnetic means traverse on both sides in a direction parallel to the formed cut and are not in front of or behind cutting edges of the cutting devices. There may be first and second magnetic means on substantially both sides of cutting devices in both the upper and lower parts. In these types of embodiments it has been found advantageous to adapt and maximise the distance between the at least first and second magnetic means to substantially maximise the magnetic moment and improve control and performance of the cutting tool.

Typically, any type of magnetic means such as permanent magnets, electromagnets or magnetised metal such as magnetised steel may be used.

Alternatively, in some embodiments magnetic means may be placed in one of either the upper or lower parts and magnetised metal such as magnetised steel placed in the other part.

In preferred embodiments, to reduce the weight of the lower part, smaller magnetic means may be placed in the lower part. This aids the travel of the lower part under a material such as plasterboard. Preferably, the magnetic means in the lower part may be about two-thirds the size of the magnetic means in the upper part.

Conveniently, stronger magnetic means may be placed at the rear of the cutting tool, thereby biasing the upper and lower parts into a substantially 'V'-shape configuration. This may help to facilitate the cutting procedure and prevent the upper and lower parts rocking and 'chattering' against one another.

It has also been found advantageous to use a shielding effect such as an interconnecting metal strip placed on top of and connecting the magnetic means in at least one of the upper and lower parts. This has several advantages such as providing a shielding effect and thereby preventing unwanted metal objects being attracted to the cutting tool. Additionally, the metal strip may increase the performance of the magnetic means by providing a closed magnetic circuit. For example, a mild steel bar with a thickness of about 5 mm may be used to connect the top of the magnetic means in both the upper and lower parts.

The strength of magnetic attraction between the upper and lower parts may be adapted for different cutting operations. Magnetic strengths of about 0.1 to 20 Tesla, about 0.2 to 10 Tesla, about 1 to 5 Tesla or about 0.5 Tesla may be suitable. For example, in cutting plasterboard, the magnetic attraction required may preferably be sufficient to cut or score through a paper-like layer on either side of the plasterboard. It has been found for cutting plasterboard that a magnetic strength of about 0.5 Tesla may be appropriate. To provide a greater cutting depth or to provide cutting operations on harder material, greater magnetic force may be required. Cutting depths ranging from about 0.1 mm to 20 mm, about 0.1 mm to 10 mm, about 0.1 to 0.5 mm, or about 1 to 2 mm may be obtained. The paper-like layers in plasterboard which may have a thickness of about 0.3 mm may therefore be cut or scored using the cutting tool according to the present invention.

The cutting tool according to the present invention may be used in a variety of cutting operations and for cutting a variety of materials or engineered building boards comprising a reinforcing layer. The cutting device cuts through or forms a score on the reinforcing layer to form a weakened area. For example, plasterboard, glass, wood, laminated wood, cardboard, tiles, plastics (such as Perspex®), glass fibre mats on glass reinforced gypsum boards, glass fibre mats on cement boards or the like may be cut.

Preferably, the cutting device may be a freely rotatable circular cutting device such as a rotatable circular cutting blade. The cutting device may be rotated manually as it is pushed over the material being cut, or alternatively the cutting device may be motorised driven using battery means or an electrical supply. The diameter of the cutting blade may be selected for the type of material being cut and the depth required and may range from about 0.5 cm to 5 cm and preferably about 1 to 2 cm. In preferred embodiments, there may be rotatable cutting blades in both the upper and lower parts which may be positioned substantially above one another or at least in line with one another. The cuts formed by the upper and lower parts may therefore be substantially collinear. This may facilitate the cut or scored material being snapped open.

The cutting device may be any suitable cutting means including any type of rotatable or fixed blade, or laser or heating/burning based cutting means.

Using rotatable cutting blades has the highly advantageous technical feature of extending the life of the cutting device in comparison with a simple knife blade. Using a rotatable cutting blade, it has been found that 300 or even 500 meters of cut may be performed with no significant deterioration in the cut quality. With a simple knife blade the cutting end may quickly wear out with the cut quality reducing after a relatively short distance such as 20 m. It is found that the rotatable circular cutting blade may have at least 20 times the lifetime of a simple knife blade. The rotatable circular cutting blade has also been found to facilitate the cutting process by improving the travel of the cutting tool over the material being cut i.e. friction is reduced. However, a simple knife blade may be used in some situations.

Conveniently, the rotatable circular cutting devices may be provided in cartridge form enabling the cutting blades to be easily replaced when necessary. A release button may be provided to facilitate removal and replacement of the cartridge. Alternatively, a cartridge may be simply pulled out of the cutting device when necessary. Providing the cutting devices in cartridges also enables different cutting heights to be provided by using a variety of different cartridges with different cutting heights. Such an arrangement also eliminates the need for a workman to adjust the depth of the cut being formed himself by using a cutting height adjustment facility in the cutting tool. The cutting tool may therefore be a multi-use tool suitable for a variety of cutting operations. However, in some embodiments the height and cutting depth of the cutting device may be altered and varied by a user for different cutting requirements.

Preferably, the cutting operation forms a cut or score depth on the material being cut. Preferably, the cut or score may be formed on both sides of a material such as plasterboard. The formed cuts or scores on both sides may be substantially collinear with another. Preferably, the cut or score may be deep enough to penetrate through, or at least weaken, the paper-like layers on both sides of the plasterboard so that a thin attaching part which remains, may be broken with minimal applied force by a user. In some situations the cuts may penetrate fully through the material. As the paper-like layers provide most of the strength in plasterboard, once these layers are cut or scored the plasterboard may be easily snapped open along the line of the formed cuts. It is found that clean straight cuts may be obtained. Additionally, curved lines such as circular cut-outs may also be easily obtained.

It is therefore not necessary that the cuts or scores on either side of the material penetrate fully through the material or a reinforcing layer in engineered building boards. All that is required, is that a weakened area such as a score is created which forms a break-line along which a user may easily snap along the cut or scored line.

In some embodiments, the underside of the upper and lower parts may comprise rotatable members such as rollers or ball bearings to facilitate the traversing of the upper and lower parts over the material being cut. However, a specific advantage of using rotatable cutting blades, is that in some situations it is not necessary to have rotatable members such as rollers and the upper and lower parts may simply slide over the material being cut. In these types of embodiments it is preferred to form the underside of both the upper and lower parts from low friction resistant material. For example, smooth plastics materials or hard smooth metals such as aluminium are suitable.

Typically, the spacing means may be any suitable means such as retractable spacing means which may comprise two separating arms at substantially the front and rear of the cutting tool. Alternatively, there may be any suitable number of spacing means. The spacing means may be retractable or telescopic. Preferably, the spacing means may be attached to the upper part. The spacing means may be biased into a substantially perpendicular orientation with respect to the underside of the upper and lower parts using any suitable means such as a spring arrangement. Conveniently, the spacing means may be capable of being forced into a position substantially flat against the underside of the upper part during the cutting operations. Preferably, the underside of the upper part may comprise recesses to receive the spacing means, thereby enabling a flat low resistance surface to make contact with the material being cut. The spacing means may have the function of preventing the upper and lower parts from coming together due to the magnetic forces present.

A range of different cutting tools may be developed which have different lengths of spacing means. Preferably, the length of the spacing means may be slightly longer than the width of the material to be cut. For example, to cut 12.5 mm thick plasterboard, the retractable spacing means may have a length of about 15 mm.

The length of the spacing means may also be adjustable using, for example, telescopic means or a threaded adjustment means arrangement to allow a user to alter the length of the spacing means for different depths of material to be cut. The spacing between the upper and lower parts may therefore be adapted and changed for different conditions.

The cutting tool may also comprise means to secure a measuring device such as a tape measure in. For example, the cutting device may comprise tape measure slots which may be used to attach a standard tape measure to, thereby allowing a user to cut and/or score a specified length. The tape measure slots may be located at the front and/or rear of the device and/or the sides of the cutting device.

The cutting device may also comprise cutting aids in the form of a series of curved guide lines on a top surface of the upper part of the cutting device which facilitates a user in the cutting of curved lines.

The cutting device may also comprise a substantially transparent area through the upper part of the cutting device which allows a user to see a cut being formed. This facilitates a user following a marked line on a material to be cut.

Typically, the upper part of the cutting tool may be shaped and adapted to facilitate gripping and application of force by a user.

Conveniently, the upper and lower parts may be moulded from any suitable plastics material. Conveniently, the plastics material may be strong and resistant to breakage. For example, polystyrene or resin based polymers may be suitable.

Moreover, the front portion of the upper and lower parts may be shaped and adapted to receive the material to be cut. For example, the front portion of the upper and lower parts may comprise rounded edges to facilitate the entry of the material to be cut into the cutting tool.

According to a second aspect of the present invention there is provided a method of performing cutting operations using said cutting tool according to the first aspect wherein the cutting tool is pushed onto a material to be cut and the cutting tool forms at least one cut or score on a surface of the material.

Typically, during the cutting operation, spacing means such as retractable spacing means move from a first configuration substantially perpendicular to the underside of the upper part of the cutting tool to a second configuration substantially parallel to the underside of the upper part and thereafter returns to the first configuration once cutting is completed.

Preferably, a rotatable cutting blade may be used in both the upper and lower parts of the cutting tool.

According to a third aspect of the present invention, the cutting tool according to the first aspect is used to perform cutting operations.

BRIEF DESCRIPTION OF THE DRAWINGS

Embodiments of the present invention will now be described, by way of example only, with reference to the accompanying drawings in which.

DETAILED DESCRIPTION

Figure 1:
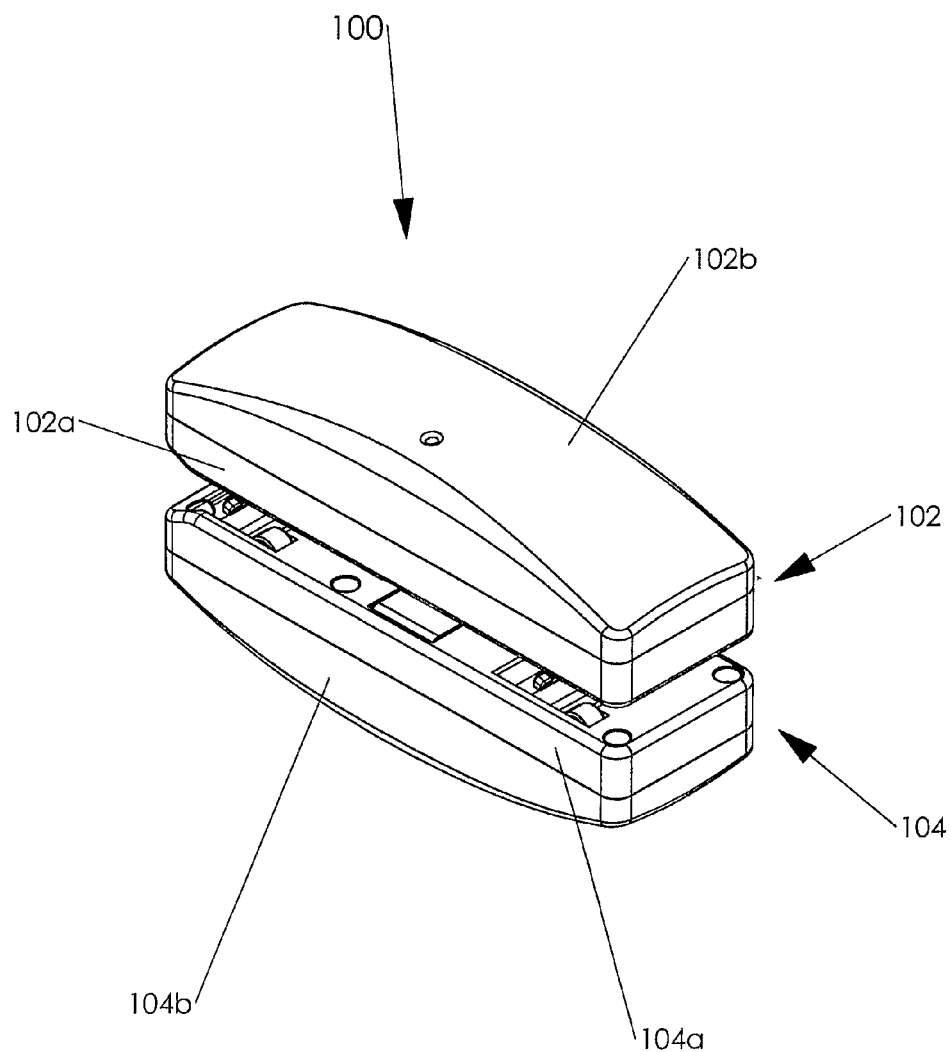
FIG. 1 is a perspective view of a cutting tool according to a first embodiment of the present invention.

Referring to FIG. 1, there is a representation of a cutting tool according to the present invention, generally designated 100. The cutting tool 100 comprises two main body parts, namely, an upper part 102 and a lower part 104.

The upper part 102 of the cutting tool comprises a main body section 102a and an outer casing 102b. Similarly, the lower part 104 of the cutting tool 100 comprises a main body section 104a and an outer casing 104b.

Although not shown in FIG. 1, the upper part 102 of the cutting tool 100 may be shaped to conform with that of a hand to facilitate the application of pressure and therefore the use of the cutting tool 100.

The upper and lower parts 102,104 are moulded from plastics material using any suitable technique known in the art.

Figure 2:
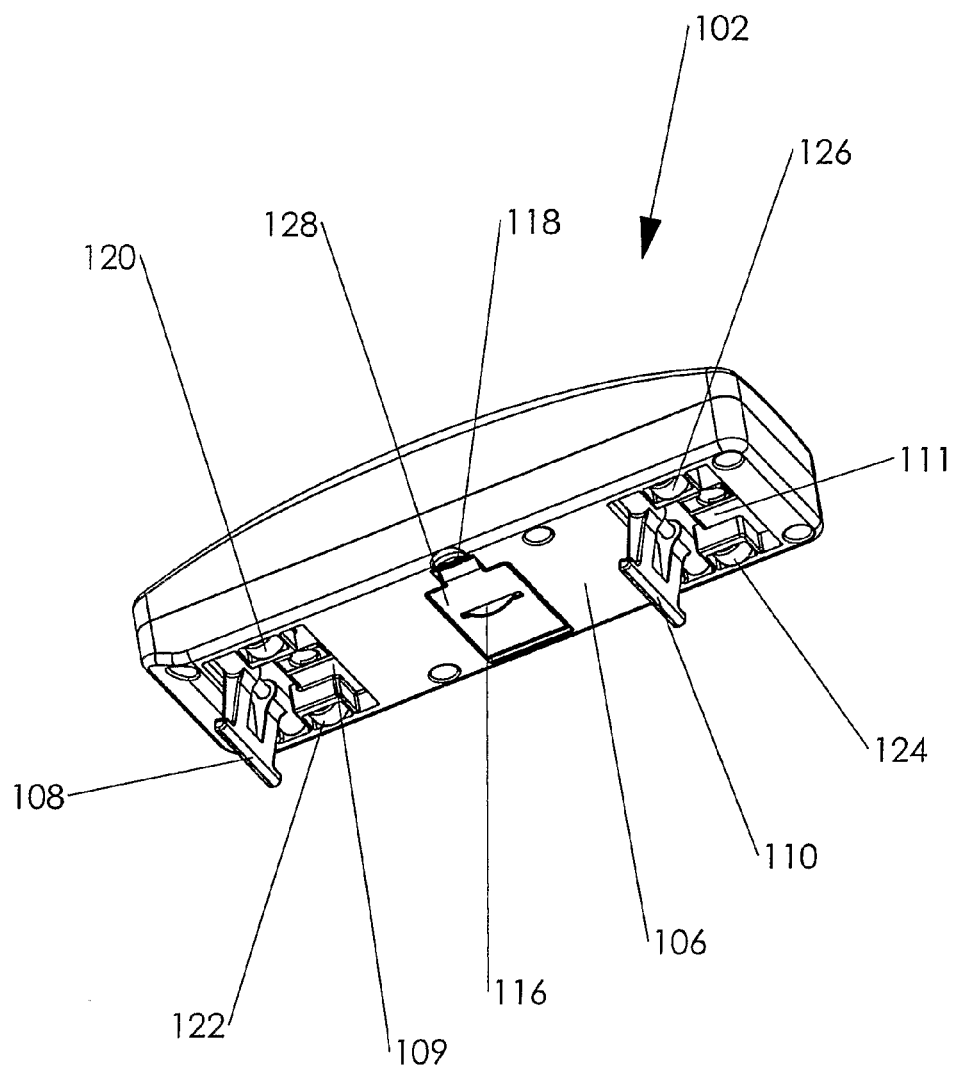
FIG. 2 is a view of the underside of a top part of the cutting tool shown in FIG. 1.

FIG. 2 is a representation of the underside 106 of the top part 102 of the cutting tool 100. On the underside 106, there are two separating arms 108,110. The separating arms 108, 110 are mounted on axles 112,114, respectively, and are biased with a spring (not shown) to the configuration shown in FIG. 2. The separating arms 108,110 may be rotated so that they are parallel with the underside 106. Recesses 109,111 on the underside 106 receive the separating arms 108,110 thereby allowing a flat low friction surface to form on the underside 106 during the cutting procedure.

On the underside 106 of the top part 102, there is also a substantially centrally mounted circular cutting blade 116. The circular cutting blade 116 is freely rotatable and is itself mounted in a cartridge 118 which is capable of being removed and replaced with a new cartridge 118 containing a new circular cutting blade 116. To adjust the cutting height of the circular blade 116, different cartridges 118 may be used to obtain different cutting depths.

FIG. 2 also shows that the underside 106 of the top part 102 of the cutting tool 100 comprises four rollers 120,122,124, 126 that are positioned at each corner of the underside 106. The four rollers 120,122,124,126 are freely rotatable and may facilitate the traversing of the cutting tool 100 over a material being cut.

Figure 3:
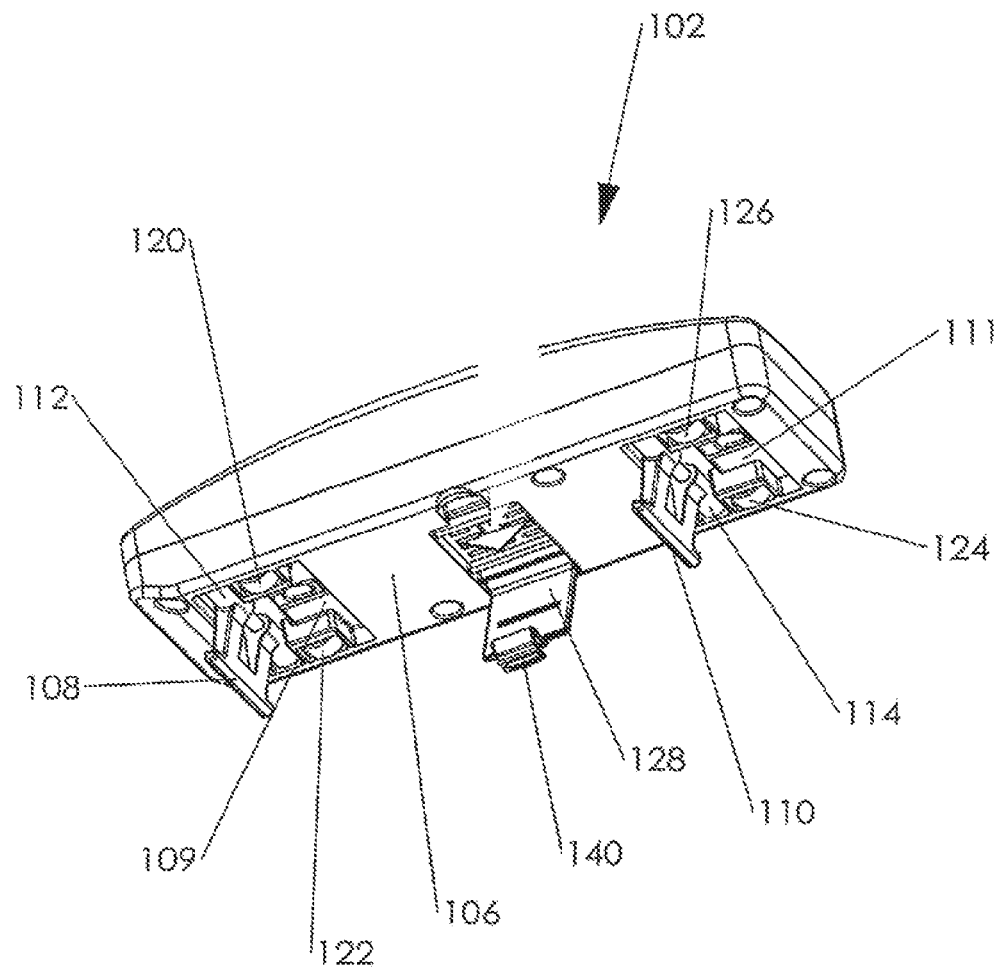
FIG. 3 is a further view of the underside of the top part of the cutting tool shown in FIG. 2 with a rotatable circular cutting blade removed.

FIG. 3 is a further view of the top part 102 of the cutting tool 100, which represents a trap door 128 in an open configuration. The trap door 128 has been opened to allow the cartridge 118 containing the circular cutting blade 116 to be removed. A replacement cartridge 118 may be inserted and the trap door 128 shut to allow cutting operations to continue.

Figure 4:
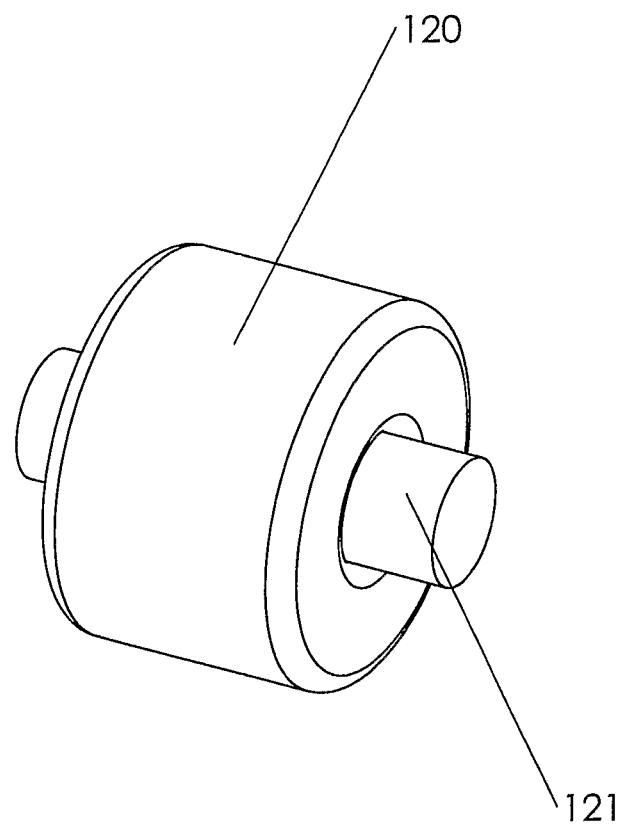
FIG. 4 is an expanded view of a roller on a spindle as used in the cutting tool shown in FIGS. 1 to 3.

FIG. 4 is an expanded view of roller 120 shown in FIGS. 2 and 3. The roller 120 is mounted on an axle 121 and is made from any suitable plastics material.

Figure 5:
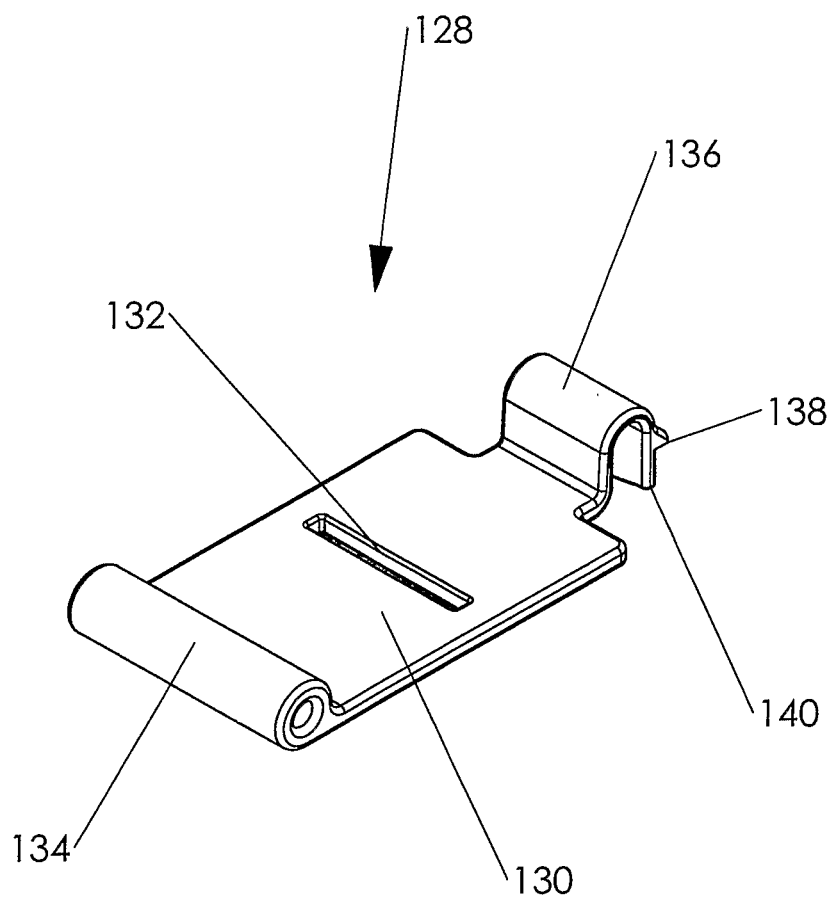
FIG. 5 is an expanded view of a trap door used in the cutting tool shown in FIGS. 1 to 3.

FIG. 5 is an expanded view of the trap door 128. The trap door 128 comprises a main flat body section 130 with an elongate slot 132 wherein the circular cutting blade 116 may protrude therethrough. On one end of the trap door 128 there is a hinge 134 about which the trap door 128 may pivot. On the other end of the trap door 128, there is a substantially 'U'-shaped catch 136 which comprises a protruding rib 138 which is capable of snap-fitting into a suitably adapted receiving member (not shown) in the top part 102 of the cutting tool 100. By pressing a section 140 on the catch 136 in towards the slot 132, the trap door 128 may be opened when required.

Figure 6:
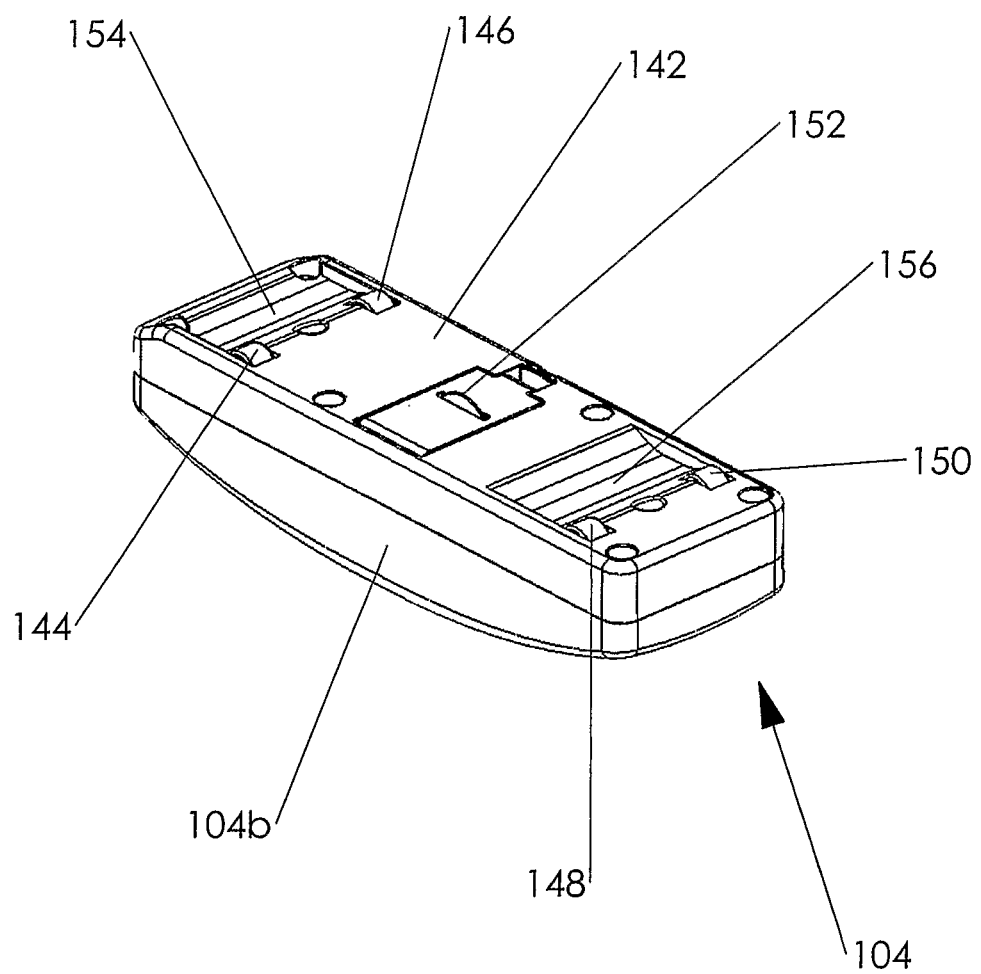
FIG. 6 is a view of the underside of a bottom part of the cutting tool shown in FIG. 1.

FIG. 6 is a view of the underside 142 of the bottom part 104 of the cutting tool 100. Similar to the top part 102, there are four rollers 144,146,148,150 and a centrally mounted circular cutting blade 152. FIG. 6 also shows that the underside 142 comprises two substantially arcuate shaped channels 154, 156. The channels 154,156 are adapted to engage with the lower parts of the separating arms 108,110.

Figure 7:
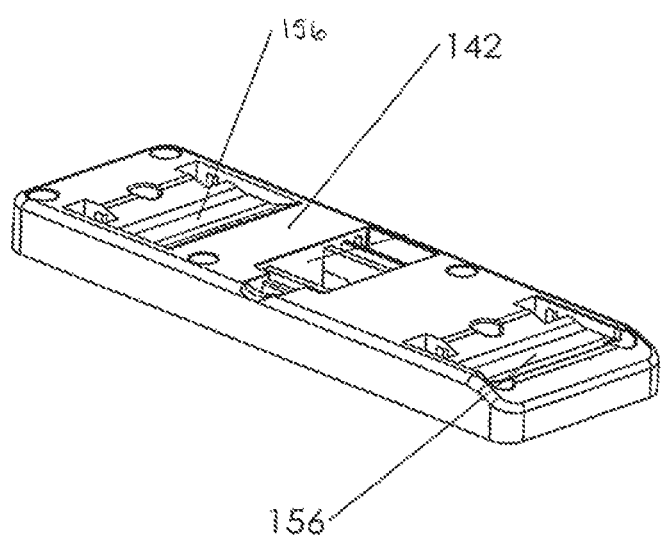
FIG. 7 is a view of the bottom part of the cutting tool shown in FIG. 6 with a rotatable circular cutting blade and rollers removed.

FIG. 7 is a further view of the underside 142 of the bottom part 104 of the cutting tool 100. The circular cutting blade 152 and four rollers 144,146,148,150 have been removed. The outer casing 104b has also been removed.

Figure 8:
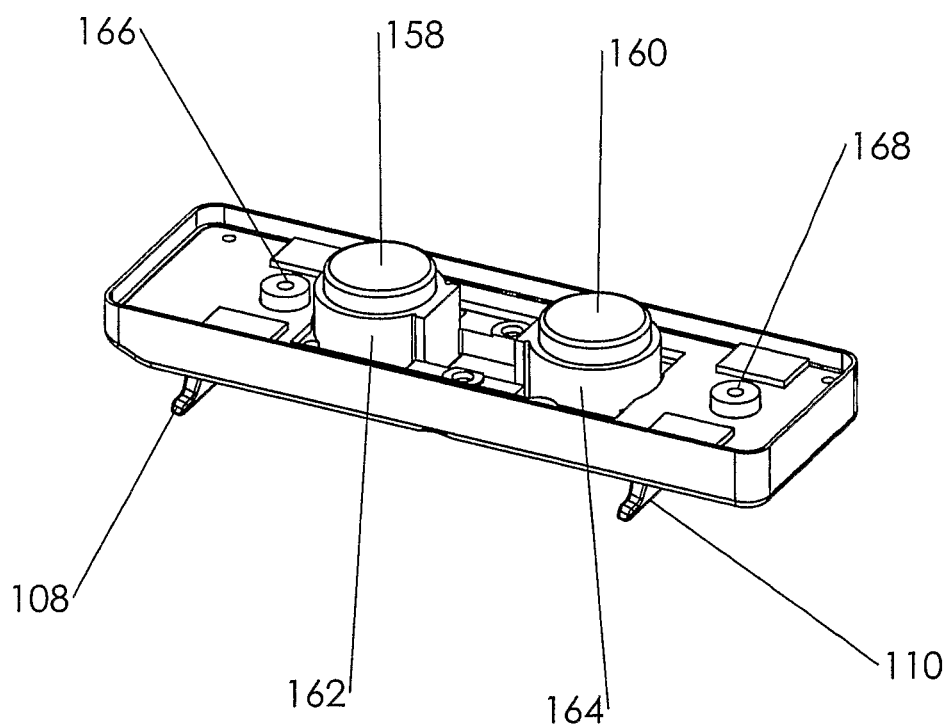
FIG. 8 is a view of the top part of the cutting tool shown in FIG. 1 wherein a casing has been removed to show the magnet location.

FIG. 8 is a view of the top part 102 of the cutting tool 100 where the outer casing 102b has been removed. FIG. 8 shows the location of two separate magnets 158,160 which are mounted substantially to the front and rear of the rotatable cutting blade 116. The magnets 158, 160 are substantially adjacent to the front and rear parts of the rotatable cutting blade 116. The magnets 158,160 are thus in the front and rear half of the cutting tool 100. The magnets 158,160 are of any suitable type and are securely held in retaining members 162,164, respectively. Although not shown, screws may be inserted through apertures 166,168 to secure the main body section 102a to the outer casing 102b.

Figure 9:
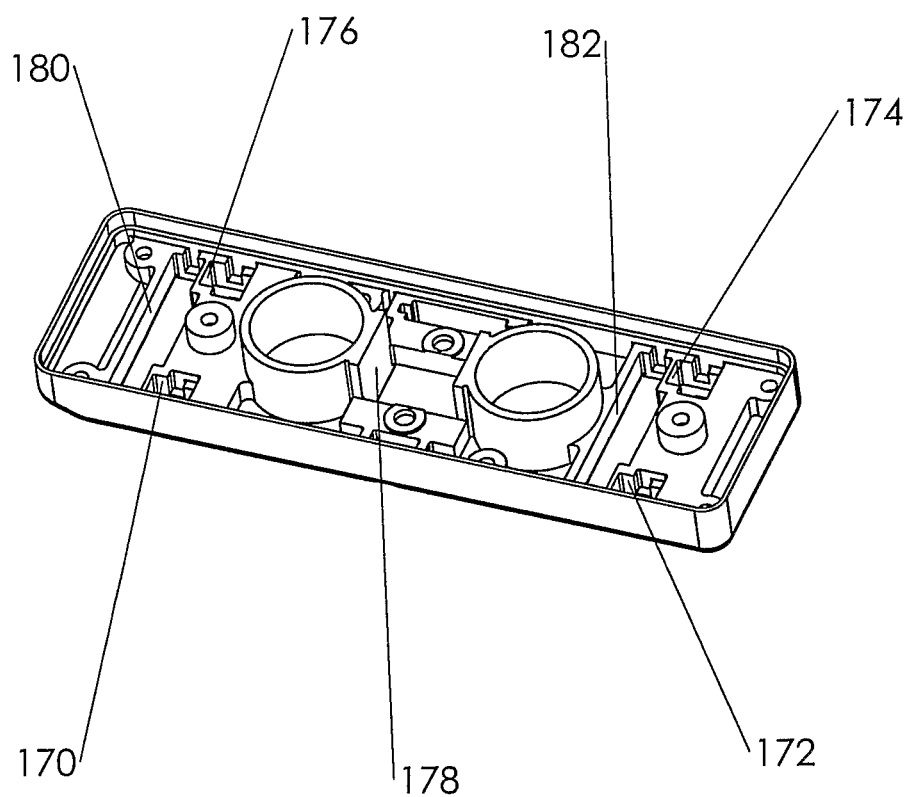
FIG. 9 is a further view of the top part of the cutting tool shown in FIG. 8 wherein the magnets, separating arms, rotatable circular cutting blade and rollers have been removed.

FIG. 9 is a further view of the main body section 102a where the magnets 158,160 have been removed. The rollers 120,122,124,126 have also been removed from recesses 170, 172,174,176, respectively. The cartridge 188 containing the circular cutting blade 116 has also been removed thereby forming an opening 178. The separating arms 108,110 have also been removed forming elongate slots 180,182.

Figure 10:
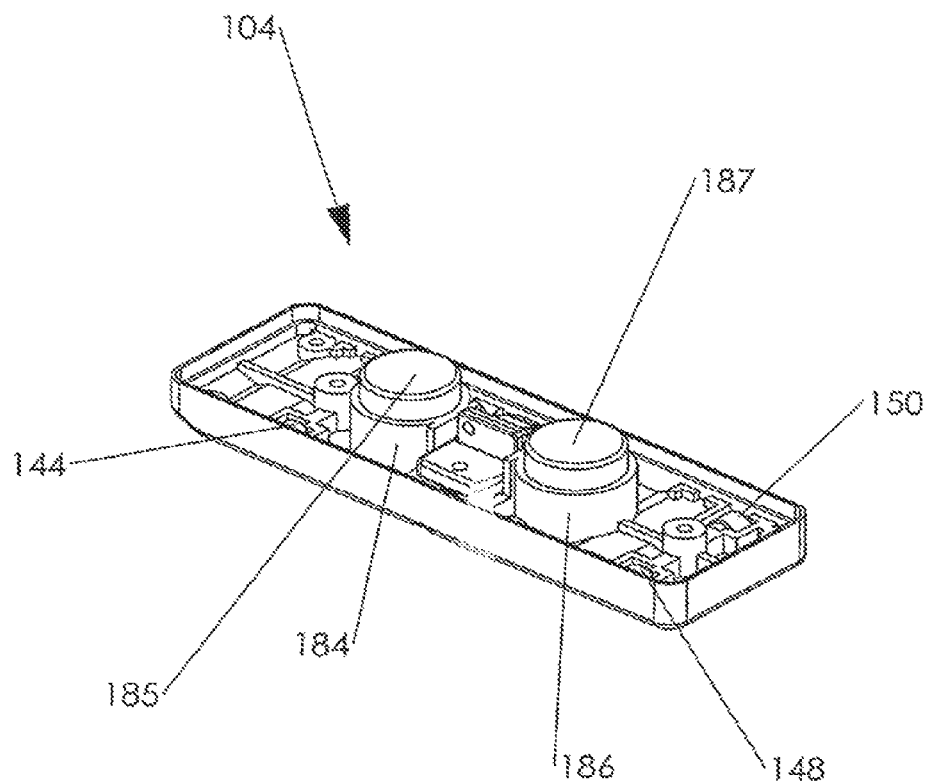
FIG. 10 is a view of the bottom part of the cutting tool shown in FIG. 1 wherein a casing has been removed to show the magnet location.

FIG. 10 is a view of the bottom part 104 of the cutting tool 100 where the outer casing 104b has been removed. FIG. 10 shows the location of two separate magnets 185,187 which are mounted substantially adjacent to the front and rear of the rotatable cutting blade 152. The magnets 185,187 are of any suitable type and are securely held in retaining members 184,186, respectively.

Figure 11:
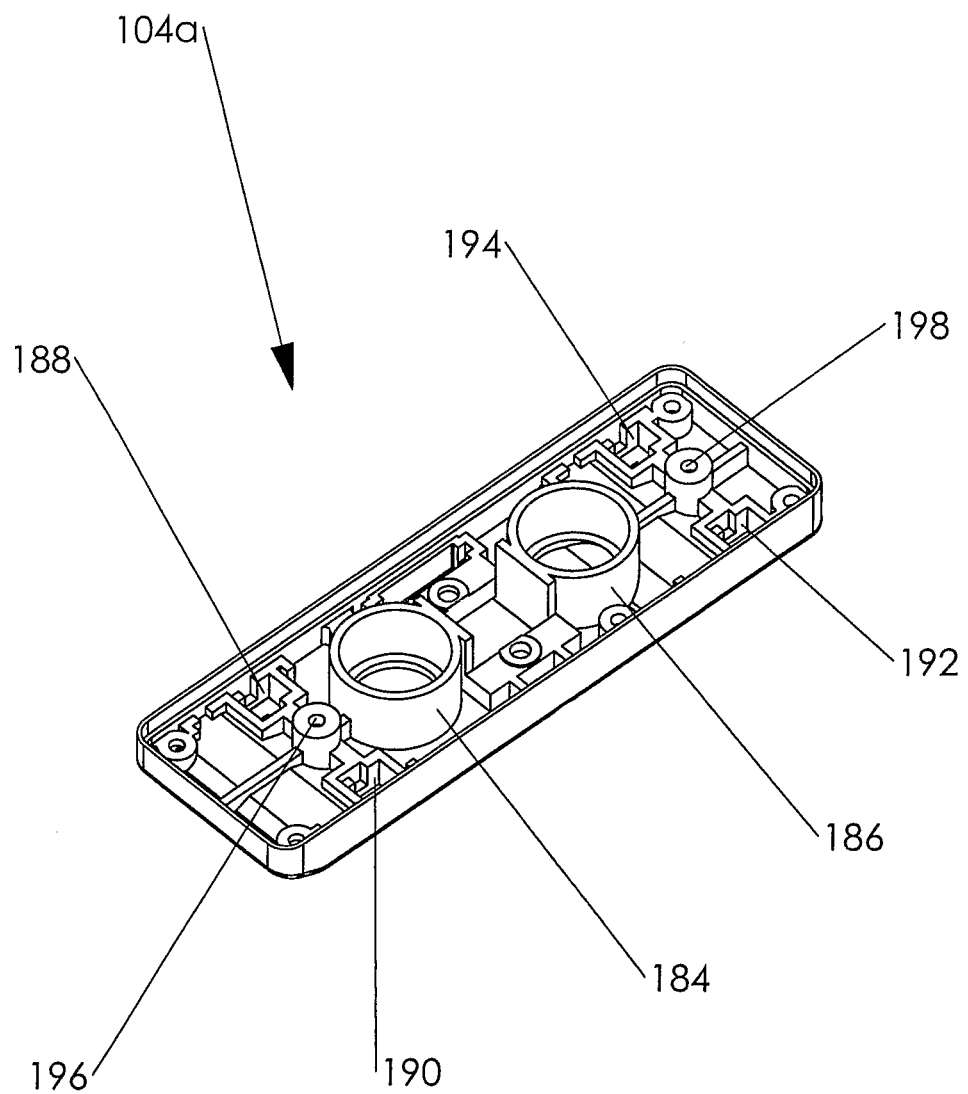
FIG. 11 is a further view of the bottom part of the cutting tool shown in FIG. 10 wherein the magnets, rotatable circular cutting blade and rollers have been removed.

FIG. 11 is a further view of the main body section 104*a* of the lower part 104. The magnets 185,187 have been removed. The rollers 144,146,148,150 have also been removed to show the roller recesses 188,190,192,194. Two apertures 196,198 are also shown where screws may be inserted to attach the main body section 104*a* to the outer casing 104*b*.

The strength of the magnets 158,160,185,187 in the upper and lower parts 102,104 may be adapted and varied for different conditions. The magnetic strength formed may be about 0.5 Tesla. Although different types of magnetic conditions may be envisaged, it is important that the magnetic strength is strong enough so that the lower part 104 of the cutting tool 100 is held sufficiently strongly against the material being cut so that the circular cutting blade 152 in the lower part 104 cuts through the required depth such as the paper-like layer on plasterboard. The magnetic strength must also be strong enough to keep the lower part 104 of the cutting tool 100 continuously in contact with the material being cut and must also be strong enough to enable an efficient cutting process to occur. It has also been found that a shielding effect may also be used to increase the magnetic strength. To obtain a shielding effect, a metal strip may be placed over the two separate magnets 158,160,185,187 in the upper and lower parts 102,104, for example please see 317 in FIGS. 18 and 19. The metal strip has the effect of enhancing the performance of the magnets as it allows a complete magnetic circuit to form. For example, a mild steel bar of about 5 mm thickness may be used.

In alternative embodiments, smaller magnets 185,187 may be used in the lower part 104, as this helps to reduce the weight of the lower part 104. For example, magnets of about two-thirds the size of magnets in the top part 102 may be used. In further embodiments, rather than using magnets in the lower part 104, magnetised metal such as magnetised steel may be used. As magnets are expensive, this has the significant commercial advantage of reducing the cost of manufacture of the cutting tool 100. In further alternative embodiments, a stronger magnetic force may be formed at the rear of the cutting tool 100, so that the upper and lower parts 102,104 may be tilted into a substantially 'V'-shape configuration. This may facilitate the cutting procedure.

A standard thickness of plasterboard which may be cut is about 12.5 mm. It is found that with such a thickness, it is required to form a magnetic strength of about 0.5 Tesla between the upper and lower parts 102,104.

Figure 12:
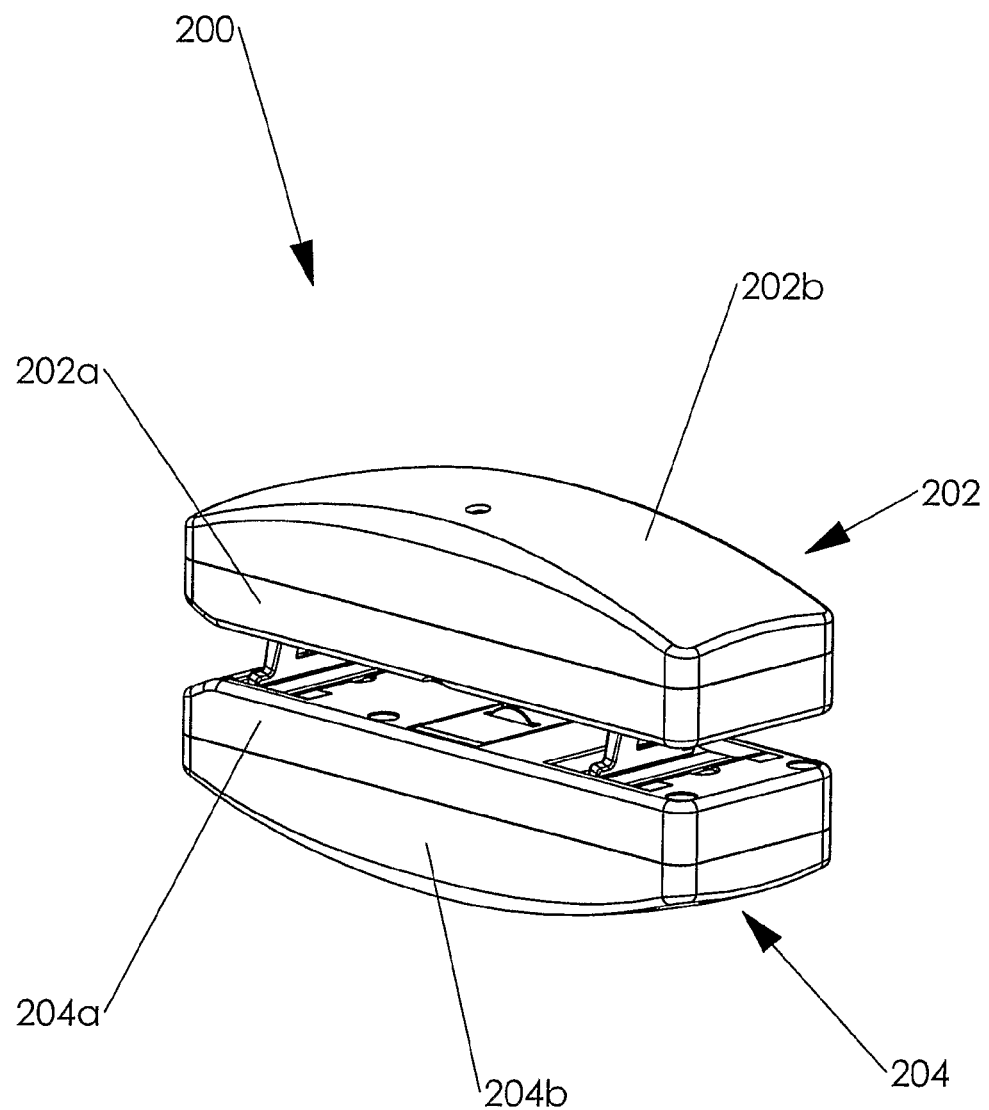
FIG. 12 is a perspective view of a cutting tool according to a second embodiment of the present invention which does not comprise rollers.
Figure 13:
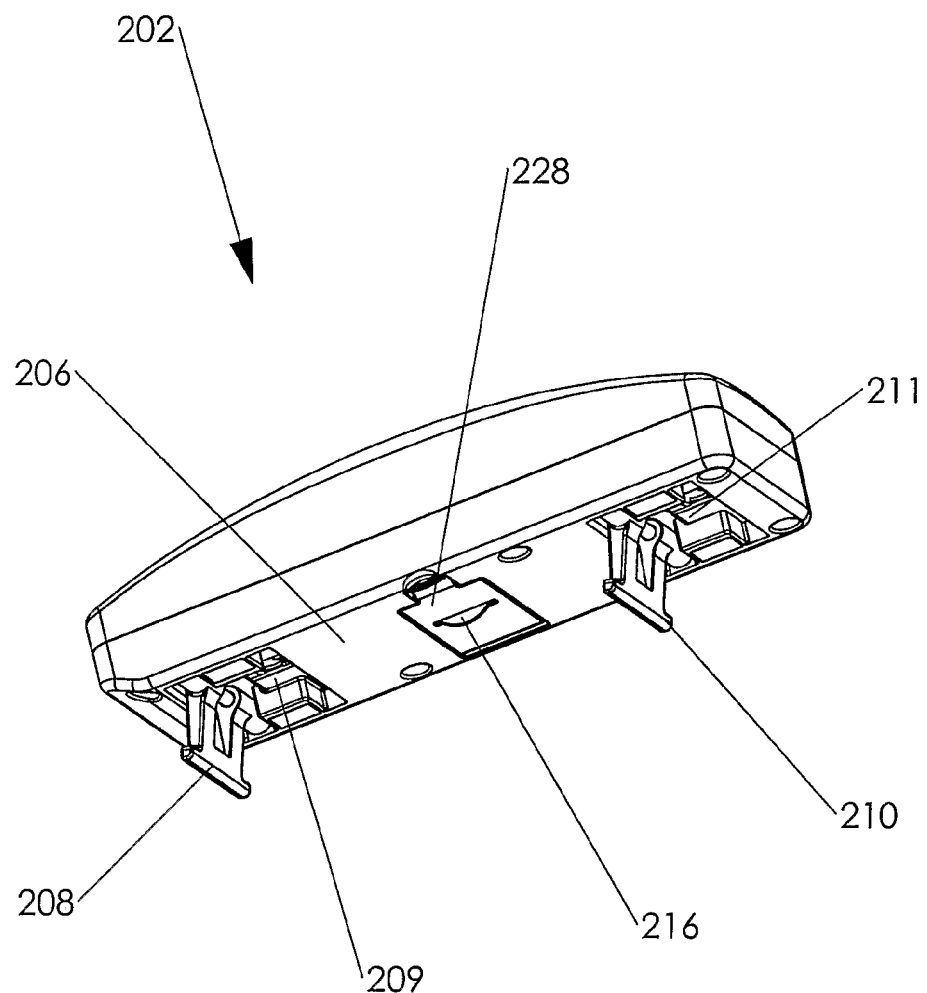
FIG. 13 is a view of the underside of a top part of the cutting tool shown in FIG. 12.
Figure 14:
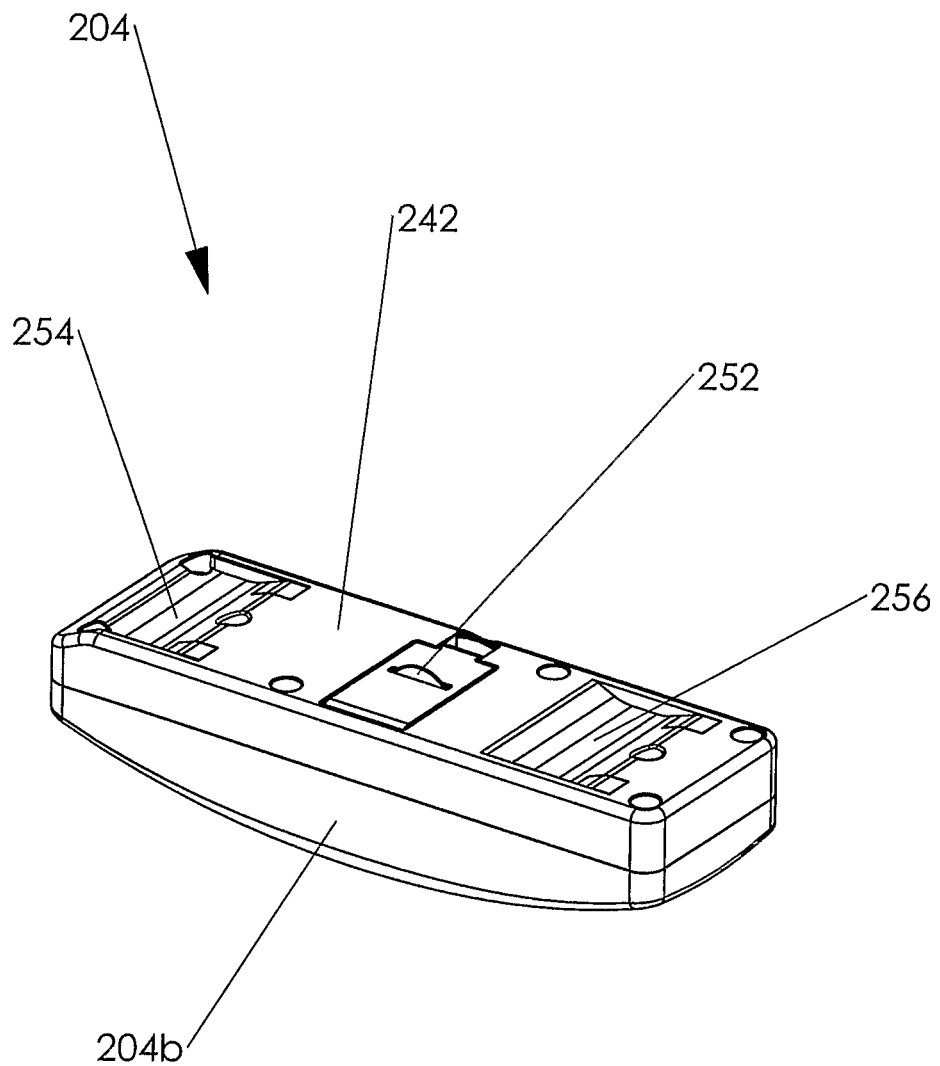
FIG. 14 is a view of the underside of a bottom part of the cutting tool shown in FIG. 12.

FIGS. 12 to 14 represent a cutting tool 200 which is similar to that shown in FIGS. 1 to 11 but has no rollers. Reference numerals with the prefix '2' are used which relate to similar features shown in FIGS. 1 to 11.

Figure 15A:
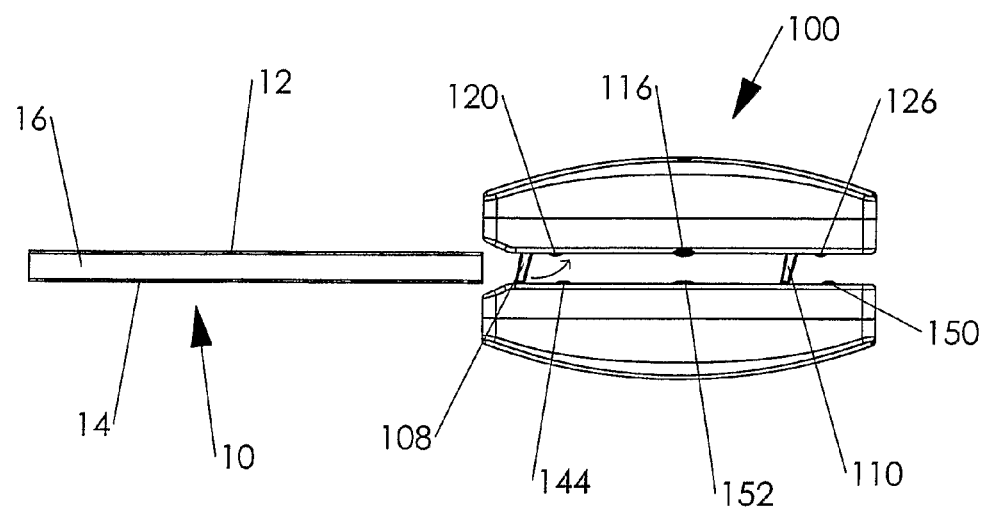
FIGS. 15a to 15e represent the cutting tool shown in FIGS. 1 to 11 in operation.

FIGS. 15*a* to 15*e* represent the cutting tool 100 in use. FIG. 15*a* shows the cutting tool 100 being lined up with a sheet of plasterboard 10 to be cut. The plasterboard comprises a central gypsum section 16 with two paper-like layers 12,14 on either side. The paper-like layers 12,14 have a thickness of about 0.3 mm.

The cutting tool 100 is first of all pushed onto the plasterboard 10 whereupon the first separating arm 108 is forced parallel onto the underside 106 of the top part 102.

Figure 15B:
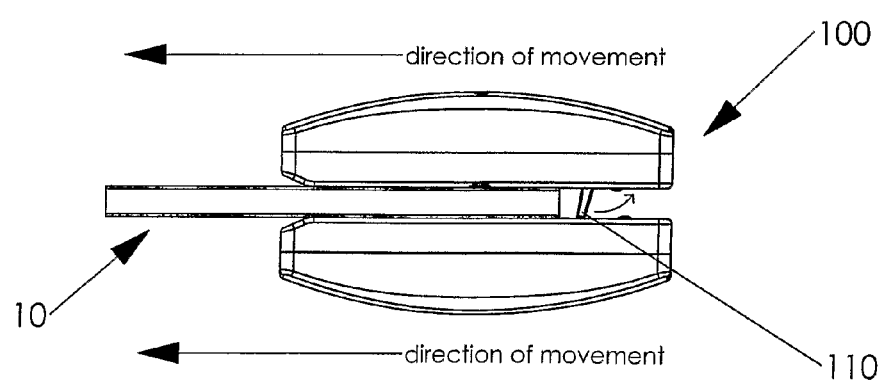

The cutting tool 100 then with the help of the rollers 120, 122,144,146 slides over the plasterboard 10 until the circular cutting blades 116,152 engage with the plasterboard 10 and start cutting through the paper-like layers 12,14. This is shown in FIG. 15*b*. The rotatable cutting blades 116,152 are mounted so that they cut through the paper-like layers 12,14.

Figure 15C:
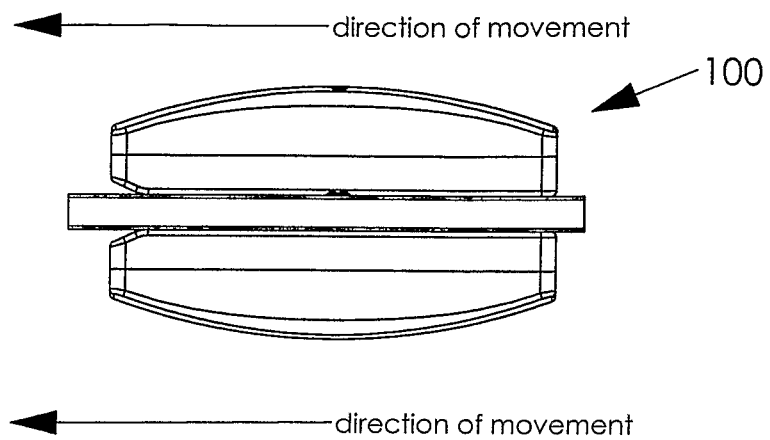

As shown in FIG. 15*c*, as the cutting tool 100 is continued to be pushed along the plasterboard 10, the second separating arm 110 is then also forced into a parallel arrangement with the underside 106 of the top part 102. Rollers 124,126,148, 150 further facilitate the traversing of the cutting tool 100 over the plasterboard 10.

Figure 15D:
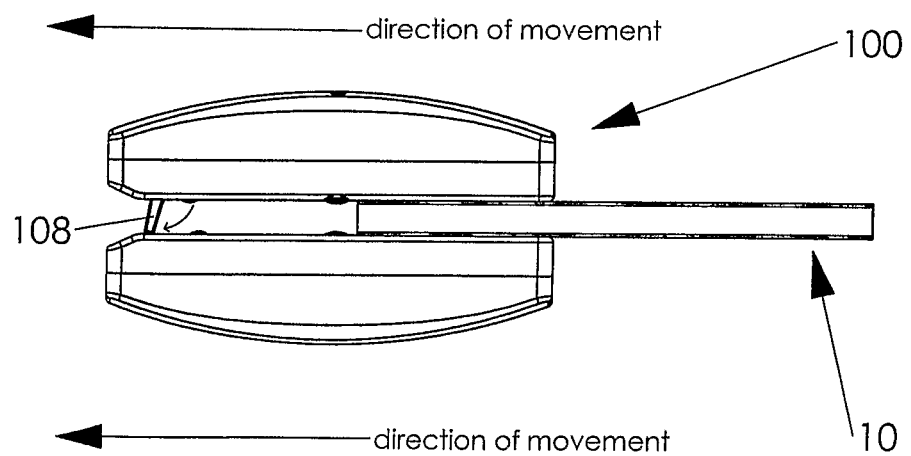

As shown in FIG. 15*d*, as the cutting tool 100 approaches the end of the plasterboard 10, the first separating arm 108 returns to its initial configuration.

Figure 15E:
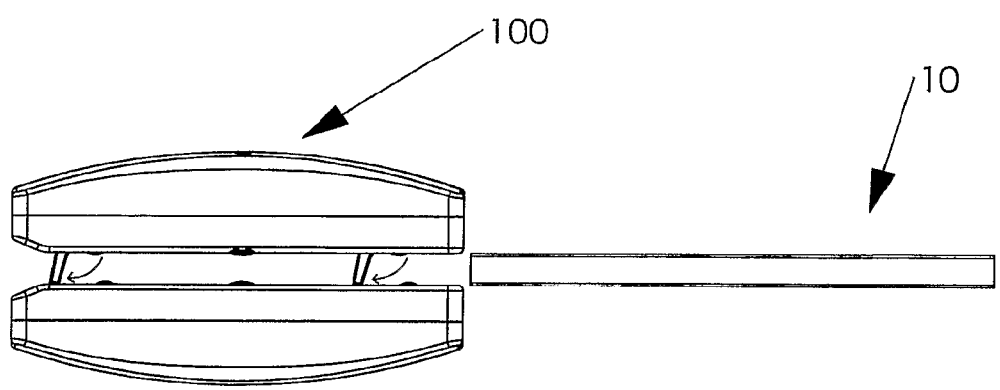

Finally, as shown in FIG. 15*e*, the second separating arm 110 returns to its original position.

The separating arms 108,110 therefore have the function of preventing the upper and lower parts 102,104 from coming together. If the upper and lower parts 102,104 came together, it would be necessary to use a vice to separate the upper and lower parts 102,104 due to the magnetic forces present.

Figure 16:
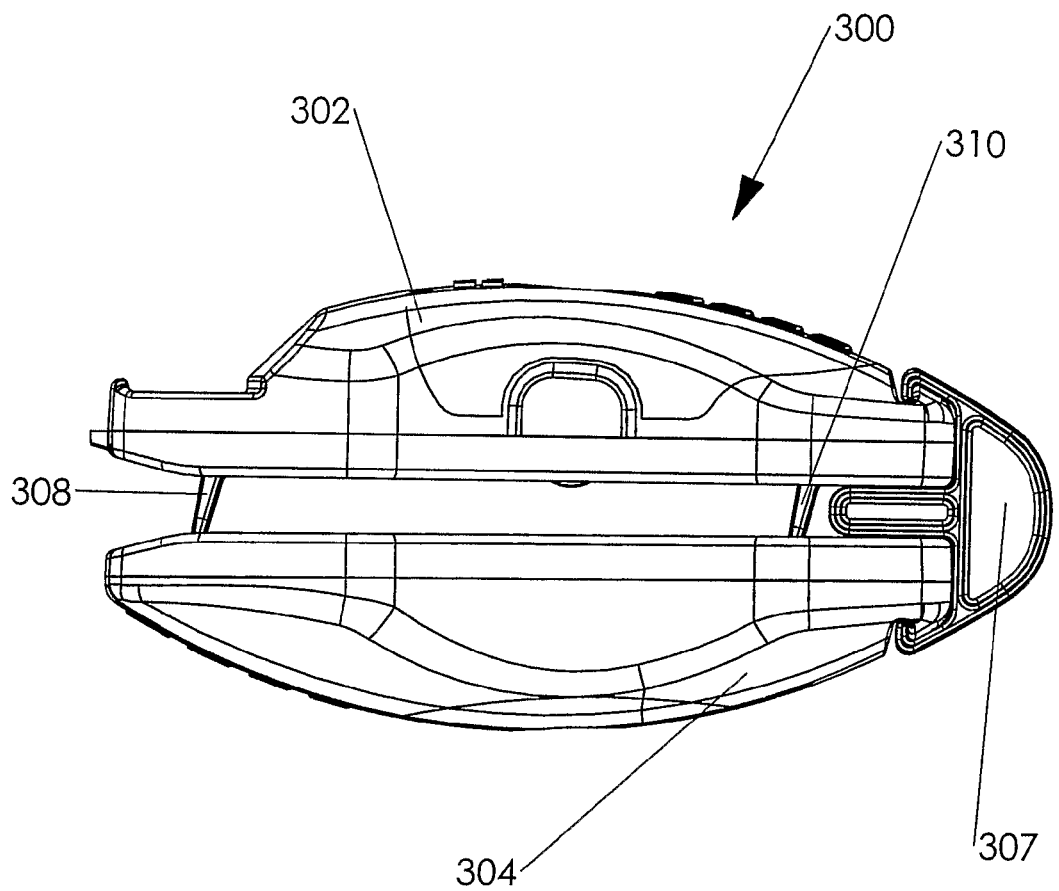
FIG. 16 is a side view of a cutting tool according to a third embodiment of the present invention.

FIG. 16 is a side view of further cutting tool 300 according to the present invention. The cutting tool 300 comprises an upper part 302 and a lower part 304. There is also shown a non-collapse clip 307 which may be used during storage of the cutting tool 300. Furthermore, as shown in FIG. 16 there are separating arms 308,310 which are rotatable as previously discussed.

Figure 17:
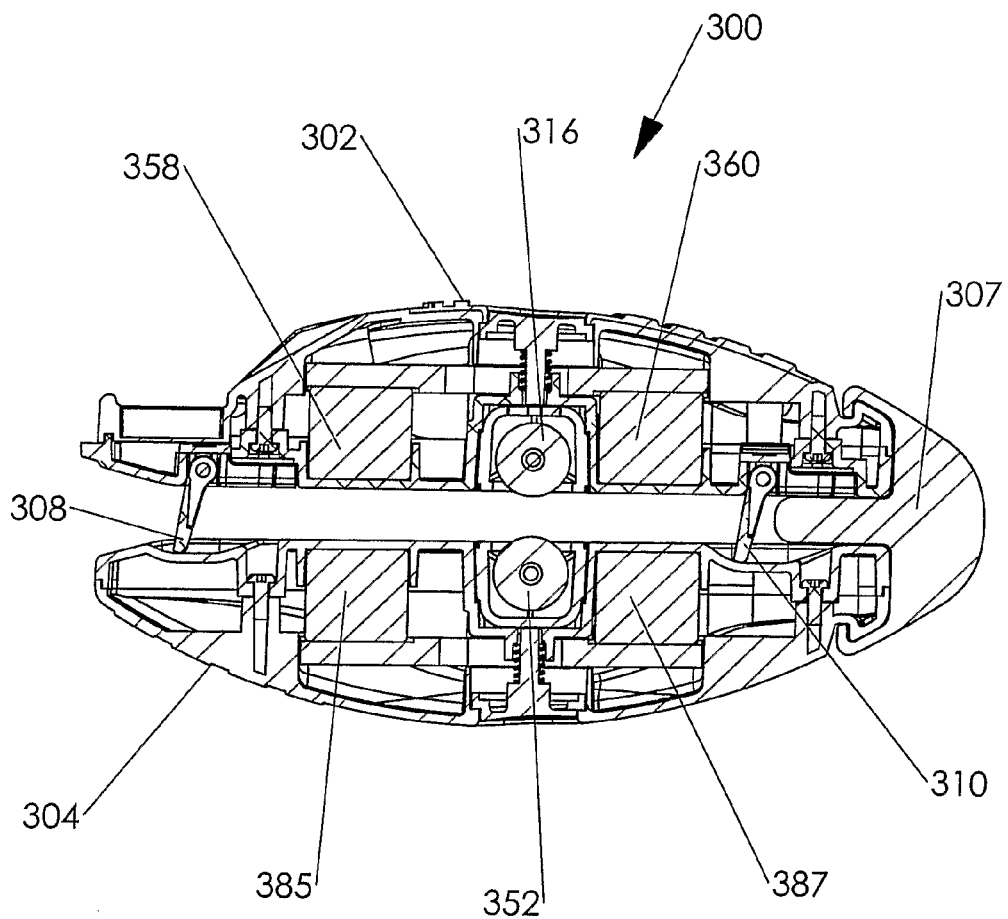
FIG. 17 is a cross-sectional view of the cutting tool shown in FIG. 16.

FIG. 17 is a cross-sectional view of the cutting tool 300. In the upper part 302 there is a circular cutting blade 316 and magnets 358,360. As shown in FIG. 17, magnetic 360 is located closer to the circular cutting blade 316 than magnet 358. It is found that by locating the magnets 358,360 in this manner, allows greater control of the cutting tool 300 and facilitates cutting by eliminating 'chattering'. The lower part 304 of the cutting tool 300 also comprises a cutting blade 352 and magnets 385,387. As shown in FIG. 17, magnets 385,387 are located directly underneath magnets 358,360, respectively.

Figure 18:
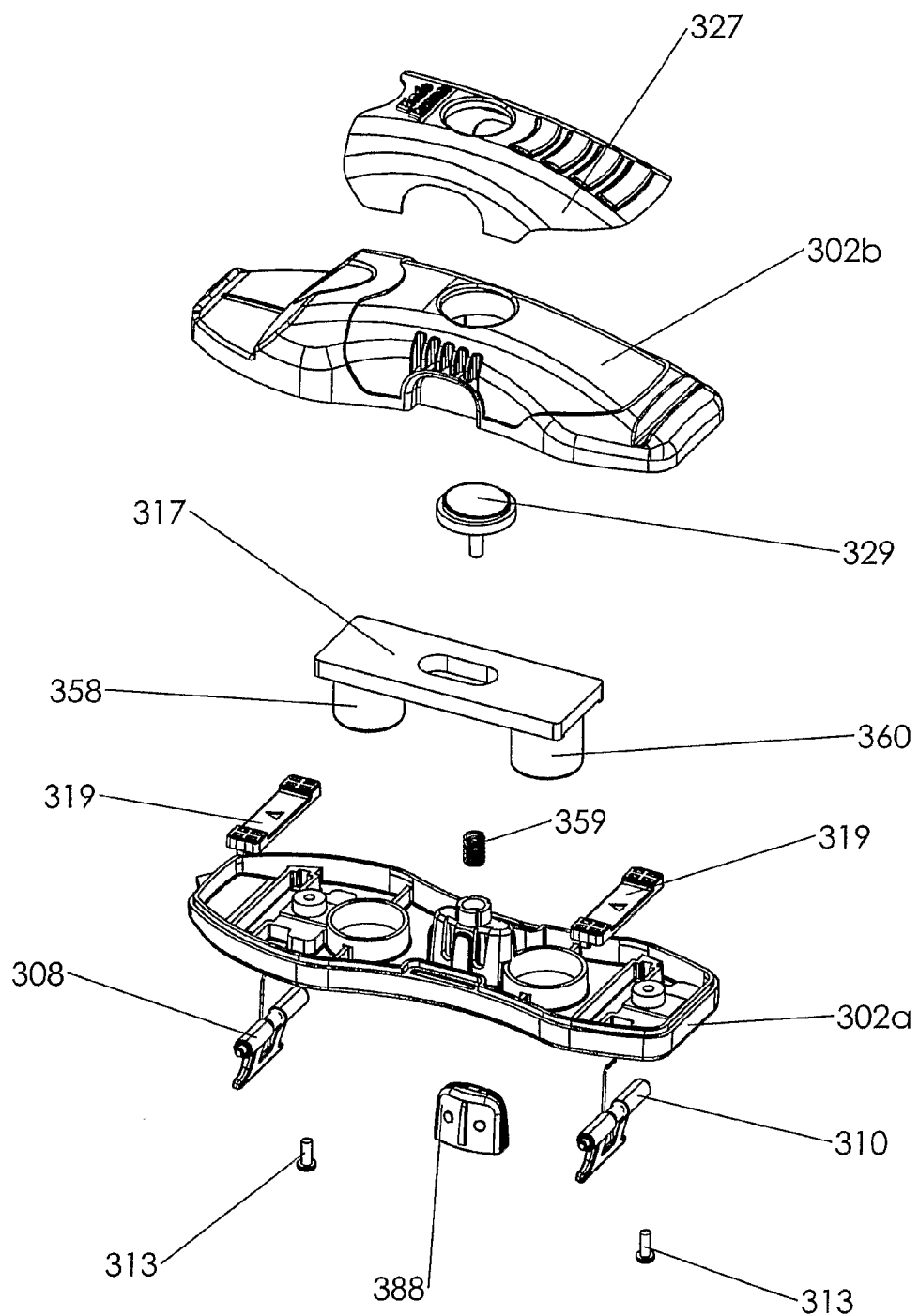
FIG. 18 is an exploded view of a top part of the cutting tool shown in FIGS. 16 and 17.

FIG. 18 is an exploded view of the top part 302 of the cutting tool 300. As shown in FIG. 18, the upper part 302 of the cutting tool 300 comprises a main body section 302*a*. FIG. 18 shows the two separating arms 308,310 ready to be inserted into the main body section 302*a*. Screws 310,313 are used to securely attach the main body section 302*a* to an outer casing 302*b*. FIG. 18 shows that there are retainer plates 319. FIG. 18 also shows that magnets 358,360 are attached to a bridging bar 317. The bridging bar 317 is a metal conducting plate and is found to increase the magnetic effect thereby increasing the efficiency of the cutting tool 300. There is also shown a blade release button 329 which may be used to replace cutting blades when required and an overmould 327 which is designed to increase and facilitate gripping by a user.

Figure 19:
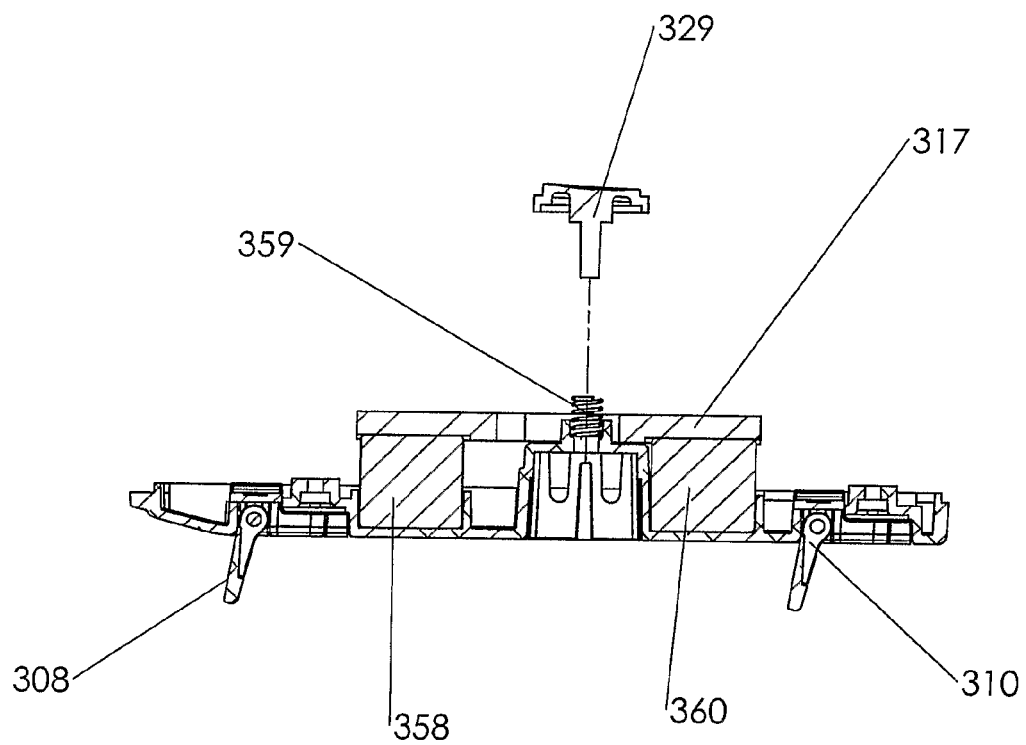
FIG. 19 is a cross-sectional view of the top part of the cutting tool shown in FIG. 18.

FIG. 19 is a cross-sectional view more clearly showing the upper part 302 of the cutting tool 300. The blade release button 329 is ready to be inserted via a spring 359.

Figure 20:
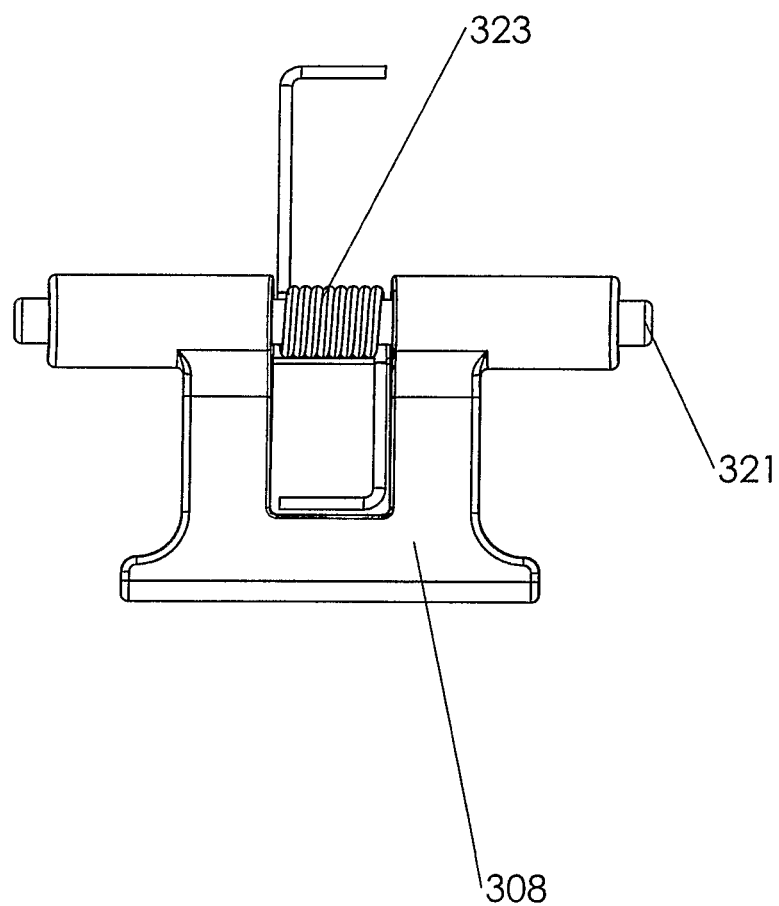
FIG. 20 is a view of a separating arm used in the cutting tool shown in FIGS. 16 to 19.

FIG. 20 is a representation of separating arm 308 and the axle 321 on which it rotates. There is also shown a spring 323 which is used to bias the separating arm 308 in a substantially perpendicular orientation to the top part 302 of the cutting tool 300.

Figure 21:
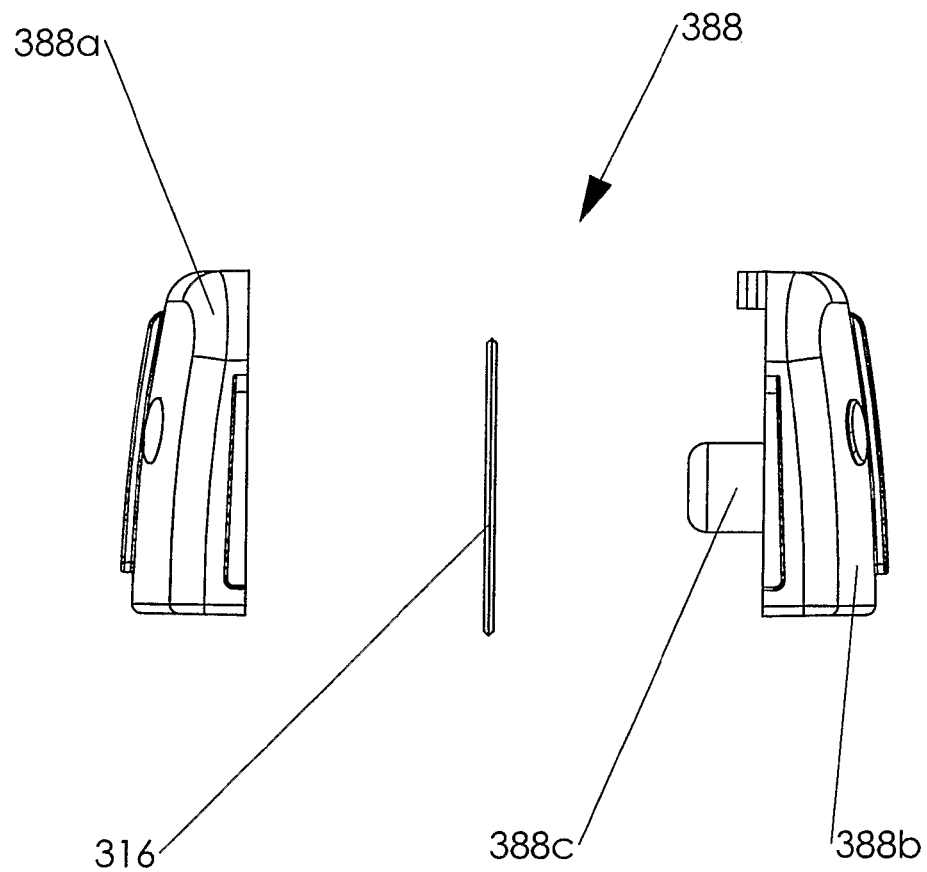
FIG. 21 is a view of a cartridge comprising a circular cutting blade used in the cutting tool shown in FIGS. 16 to 20.

FIG. 21 is a representation of the cartridge 388 comprising the circular cutting blade 316. As shown in FIG. 21, the cartridge 388 comprises two halves 388*a*,388*b* which may be snap-fitted into engagement with each other via a protruding member 388*c*. On the snap-fitting of the two halves 388*a*, 388*b*, the circular cutting blade 316 is secured therebetween and may freely rotate. After a period of use, the cartridge 388 may be removed using the blade release button 329, and a new cartridge inserted containing a new cutting blade. The cartridge 388 may be secured within the cutting tool 300 using any appropriate means.

Figure 22:
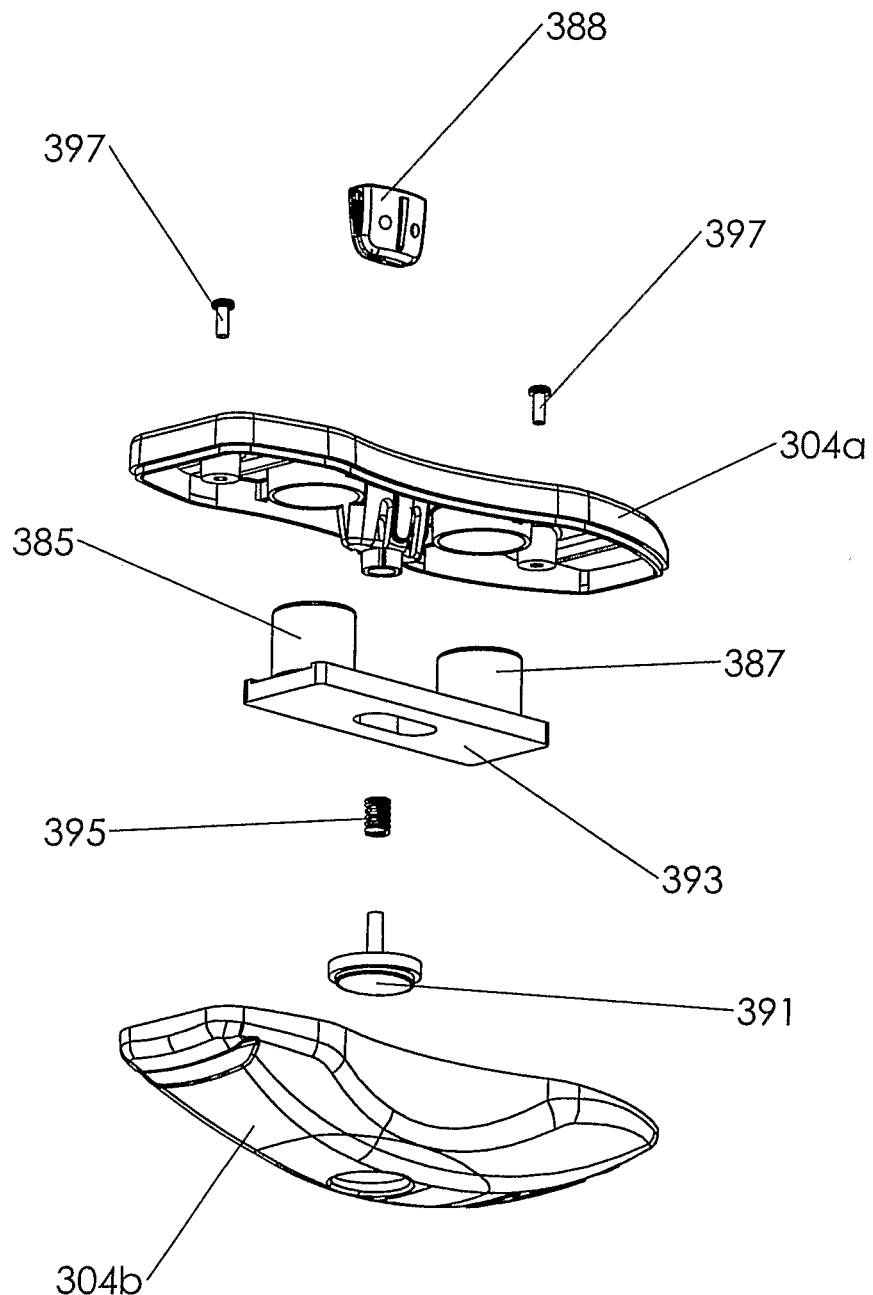
FIG. 22 is an exploded view of a bottom part of the cutting tool shown in FIGS. 16 to 21.

FIG. 22 is an exploded view of the bottom part 304 of the cutting tool 300. As shown in FIG. 22, the lower part 304 comprises a main body section 304a and an outer casing 304b. The cartridge 388 may be released using a blade release button 391 which may be connected via a spring 395. FIG. 22 also shows the magnetic means 385,387 attached using a bridging plate 393 made from mild steel. Screws 397 may be used to secure the main body section 304a to the outer casing 304b.

Figure 23:
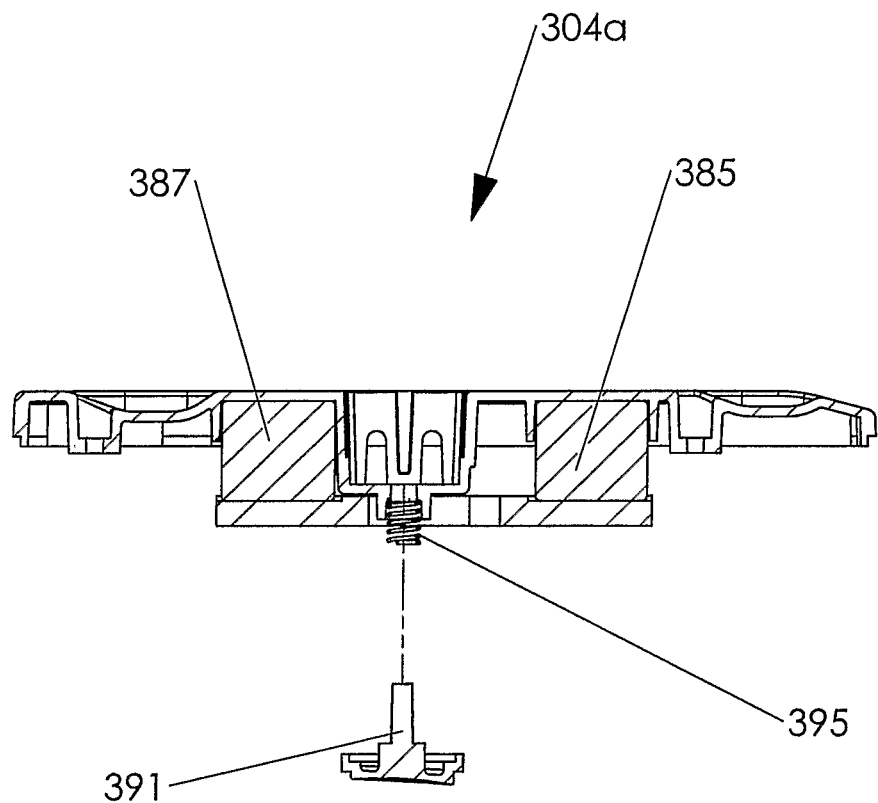
FIG. 23 is a cross-sectional view of the bottom part of the cutting tool shown in FIG. 22.

FIG. 23 is a cross-sectional view of the lower part 304a of the cutting tool 300. As shown in FIG. 23, magnet 387 is located closer to the cutting blade 352.

Whilst specific embodiments of the invention have been described above, it will be appreciated that departures from the described embodiments may fall within the scope of the invention. For example, any suitable type of cutting blades may be used. For example, a fixed knife blade or a rotatable circular cutting blade may be used. In particular embodiments, the length of the separating arms may be adjustable using any suitable means. Additionally, different cutting tools may have different lengths of separating arms to allow different thickness of materials to be cut. The magnetic strength in the upper and lower parts may also be adapted to allow for different cutting depths and different types of material to be cut such as any engineered board comprising a reinforcing layer. For example, any materials such as plasterboard, glass, wood, laminated wood, cardboard, tiles and any form of plastics material, for example Perspex®, may be cut. Furthermore, any suitable type of magnetic means may be used.

The invention claimed is:

1. A cutting tool capable of performing cutting or scoring operations, said cutting tool comprising:
    an upper part and a lower part, wherein at least one of said upper and lower parts comprises a cutting device;
    means for creating a magnetic attraction;
    means for creating a space between said upper and lower parts;
    wherein said upper and lower parts are held together with said means for creating a magnetic attraction and separated by said means for creating a space; and
    a metal strip positioned on top of and connecting the means for creating a magnetic attraction in at least one of the upper and lower parts.

2. A cutting tool according to claim 1, wherein the means for creating magnetic attraction is located in either the upper or lower parts.

3. A cutting tool according to claim 1, wherein the means for creating a magnetic attraction is positioned in both the upper and lower parts.

4. A cutting tool according to claim 1, the means for creating a magnetic attraction comprising first and second means for creating a magnetic attraction, wherein the first means for creating a magnetic attraction is positioned within the upper part and the second means for creating a magnetic attraction is positioned within the lower part.

5. A cutting tool according to claim 1, wherein the upper and lower parts each further comprise front and rear halves, and wherein the means for creating a magnetic attraction is positioned at the front and rear half of both the upper and the lower parts of the cutting tool.

6. A cutting tool according to claim 1, the cutting device positioned within the upper part and a second cutting device positioned within the lower part of the cutting tool.

7. A cutting tool according to claim 1, wherein the metal strip is a metal conducting plate which increases the magnetic attraction.

8. A cutting tool according to claim 1, wherein the means for creating a magnetic attraction are selected from the group consisting of permanent magnets, electro-magnets and magnetized metal.

9. A cutting tool according to claim 1, wherein the magnetic attraction is about 0.1 to 20 Tesla.

10. A cutting tool according to claim 1, wherein the magnetic attraction provides sufficient attractive force between the upper and lower parts for the cutting device to cut through or score a paper layer on the plasterboard.

11. A cutting tool according to claim 1, wherein the cutting device is a freely rotatable substantially circular cutting blade.

12. A cutting tool according to claim 1, wherein the cutting device comprises first and second circular cutting blades, the first circular cutting blade located in the upper part and the second circular cutting blade located in the lower part.

13. A cutting tool according to claim 1, wherein the cutting device is provided in a cartridge which is capable of being replaced when necessary.

14. A cutting tool according to claim 1, wherein an underside of the upper and lower parts comprises rotatable members to facilitate the upper and lower parts traversing over material to be cut.

15. A cutting tool according to claim 1, wherein the means for creating a space is retractable.

16. A cutting tool according to claim 1, wherein the upper and lower parts each further comprise a front and a rear, and wherein the means for creating a space is provided at the front and rear of the upper and lower parts.

17. A cutting tool according to claim 1, wherein the means for creating a space comprises legs pivotally connected to at least one of said upper and lower parts, whereby the pivotal connection allows the means for creating a space to be positioned substantially flat against an underside of at least one of said upper and lower parts during cutting operations.

18. A cutting tool according to claim 1, wherein there is provided a release button which is capable of releasing the cutting device when it is ready to be replaced.

19. A method of performing cutting or scoring operations using the cutting tool according to claim 1, wherein the cutting tool is pushed onto a material to be cut and the cutting tool forms at least one cut or score on the material.

20. A method according to claim 19, wherein the cutting device comprises first and second blades, the first blade located in the upper part and the second blade located in the lower part and wherein the material includes an upper face and a lower face and wherein the cutting tool provides a cut or score on both the upper and lower face of the material being cut.

21. A method according to claim 19, wherein the means for creating a space has a first configuration substantially perpendicular to an underside of the upper and lower parts of the cutting tool and a second configuration substantially parallel to the underside of the upper and lower parts and thereafter returns to the first configuration once cutting is completed.

22. Use of a cutting tool according to claim 1 in performing cutting operations on engineered building boards, plasterboard, glass, wood, laminated wood, cardboard, tiles, plastics, glass fibre mats on glass reinforced gypsum boards or glass fibre mats on cement boards.

* * * * *